Nov. 7, 1967  F. W. SOUTHAM  3,351,461
PROCEDURES FOR DECOMPOSING GASEOUS ALUMINUM SUBHALIDE
Filed May 19, 1965  3 Sheets-Sheet 1
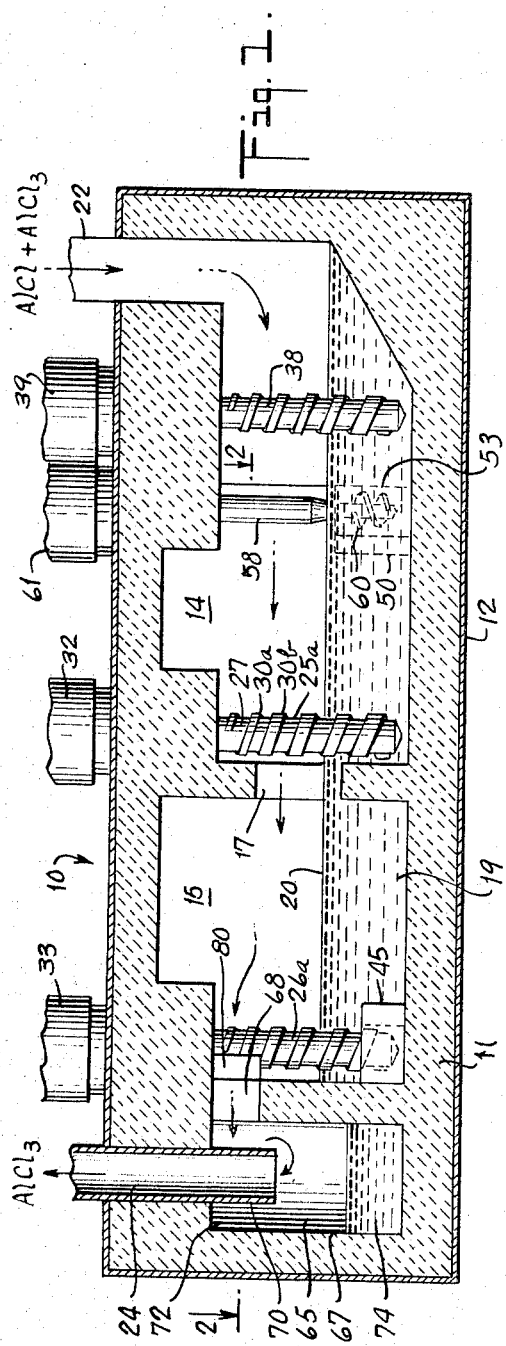
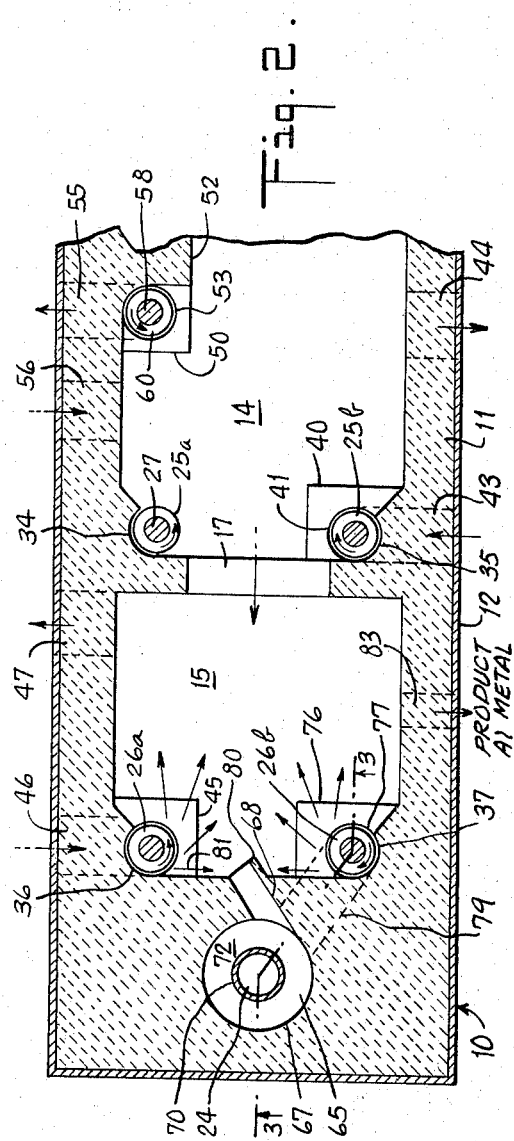
INVENTOR.
FREDERICK WILLIAM SOUTHAM
BY
Robert S. Dunham
ATTORNEY

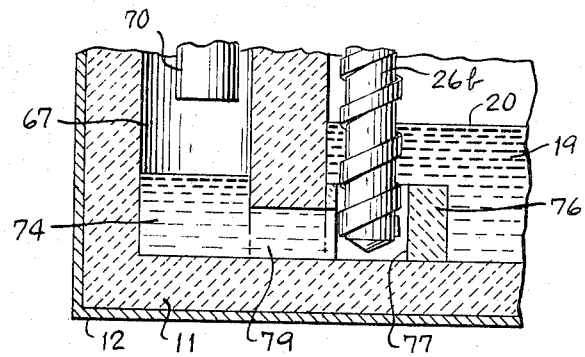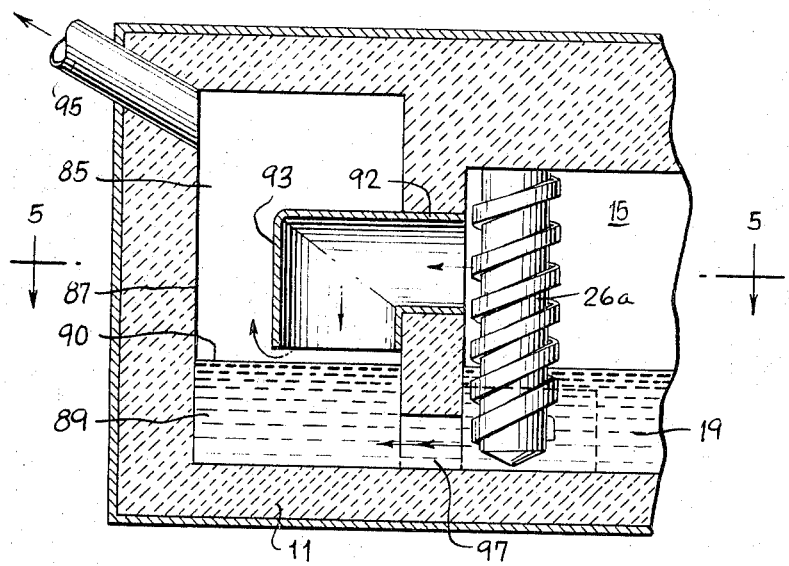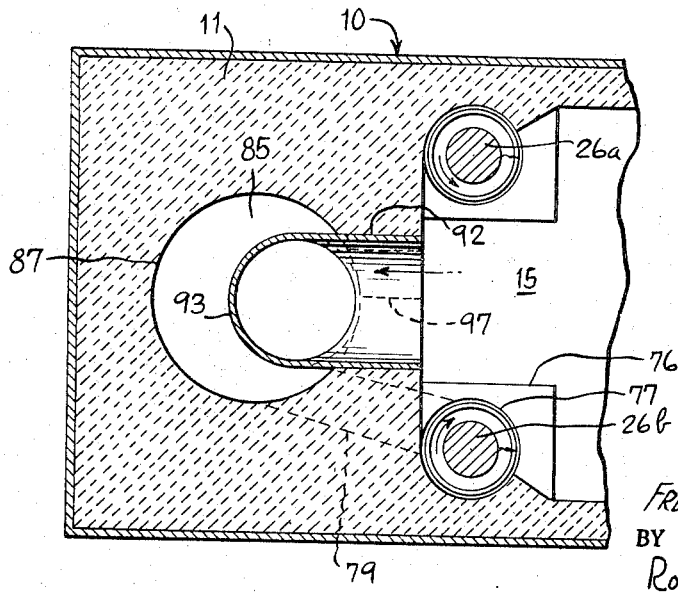

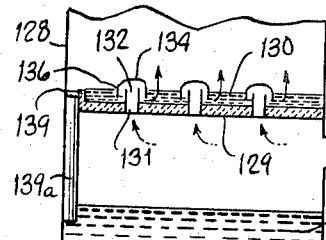
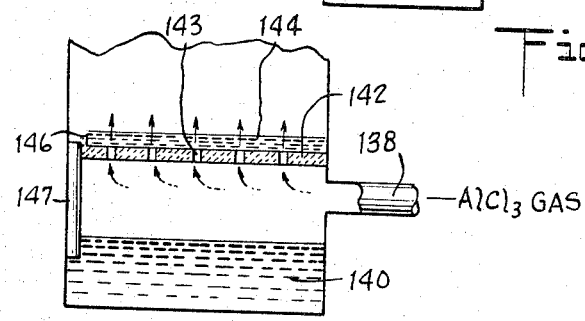
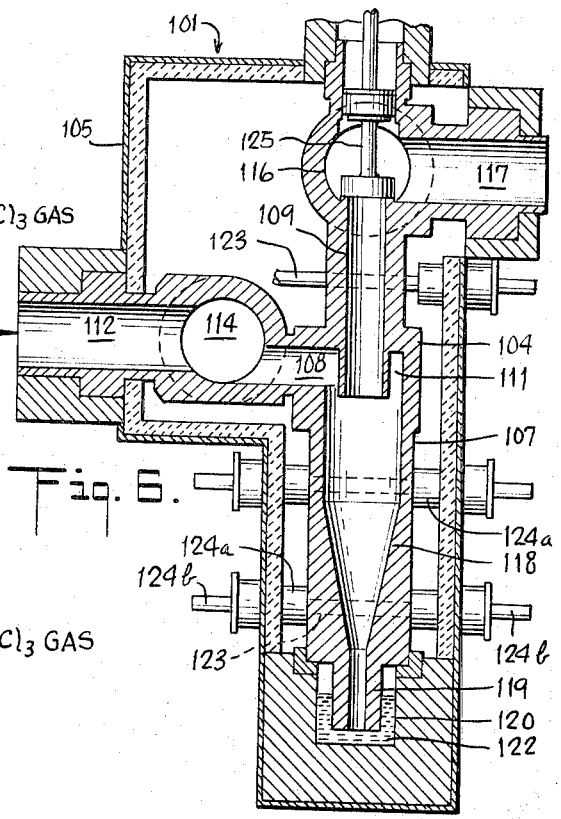
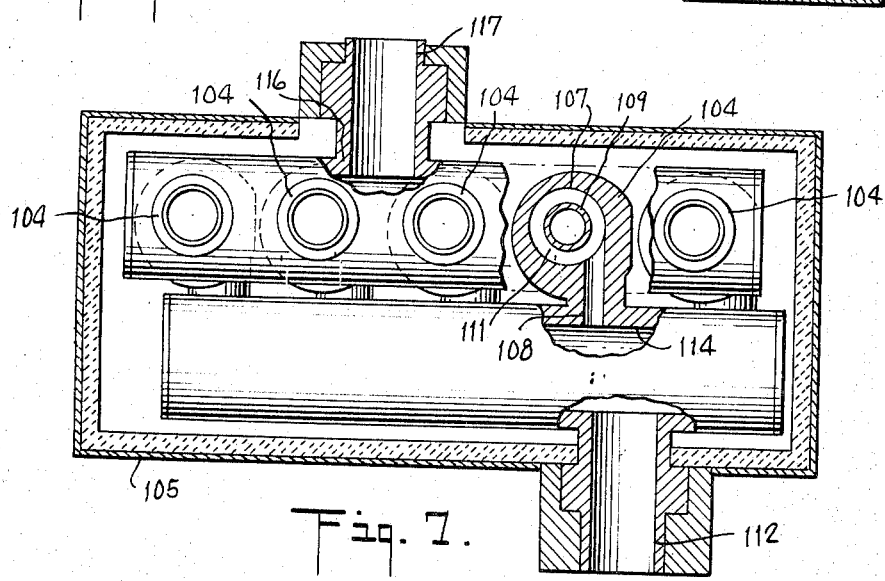

3,351,461
Patented Nov. 7, 1967

3,351,461
PROCEDURES FOR DECOMPOSING GASEOUS ALUMINUM SUBHALIDE
Frederick William Southam, Arvida, Quebec, Canada, assignor to Aluminium Laboratories Limited Dominion, Montreal, Quebec, Canada, a corporation of Canada
Filed May 19, 1965, Ser. No. 456,977
14 Claims. (Cl. 75—68)

ABSTRACT OF THE DISCLOSURE

In subhalide distillation of aluminum, a flow of gas containing gaseous aluminum subhalide and passing through a first confined region is brought into contact with a cooling surface maintained at a temperature above the melting point of aluminum to cool and decompose the subhalide into molten aluminum and aluminum normal halide gas, the temperature differential between the gas and the cooling surface being such as to cause formation and entrainment of aluminum fog droplets in the gas leaving the first confined region; this gas is then conducted into a second confined region and there caused to impinge against a surface maintained at a temperature above the melting point of aluminum so that the fog droplets coalesce on such surface and collect in the second confined region as a body of molten aluminum metal, thereby removing the fog from the gas. The surface on which the fog-containing gas impinges may be a wall of a cyclone chamber or a surface of a body or layer of molten aluminum metal.

---

This invention relates to the so-called subhalide distillation of aluminum from alloys or like metallic materials containing aluminum together with other metals. In particular, the invention relates to procedures and apparatus for decomposing gaseous subhalide of aluminum to yield aluminum metal and gaseous aluminum normal halide.

The production of purified aluminum metal from crude aluminum-containing alloys by subhalide (e.g. monochloride) distillation as disclosed for example in United States Patent No. 2,937,082, involves reaction of the alloy with aluminum normal halide (e.g. aluminum trichloride, $AlCl_3$) in gaseous state at elevated temperature. Thus, in an illustrative example of such operation, a mass of granules or particles of the alloy is exposed to a continuous flow of aluminum trichloride gas in a suitable converter or furnace at a temperature ordinarily in excess of 1000° C. Aluminum in the alloy reacts with some of the trichloride gas in the converter to form aluminum monochloride gas (i.e. AlCl). The monochloride gas passes from the converter, together with the unreacted portion of the trichloride gas, to a decomposer region where the gases are cooled to effect decomposition of the monochloride gas to yield reconstituted aluminum trichloride gas and the desired purified product aluminum metal. Aluminum trichloride gas is discharged from the decomposer; for the sake of convenience and economy of operation this latter gas is, in accordance with conventionally proposed procedures, recycled to the converter for reuse therein.

Referring now more particularly to the operation in the decomposer region, it will be understood that the gas delivered thereto from the converter is initially at a temperature comparable to that in the converter region (i.e. ordinarily above 1000° C.) and that, as stated, the purified product metal is recovered by bringing the gas into contact with a cooling surface in this region to cool the gas to a temperature at which the monochloride decomposes into metallic aluminum and aluminum trichloride; since the latter reaction is exothermic in character, this cooling necessitates extensive removal of heat. As an example of such operation, in accordance with procedures heretofore proposed the gas flow may be cooled by vigorously splashing or spraying molten aluminum from a body thereof maintained in the decomposer region, through the flow of gas in the latter region to afford extended intimate contact between the gas and molten metal, while removing heat from the molten body; in such case the splashed molten metal provides the cooling surface, the product aluminum metal being deposited in the molten body. Desirably, essentially complete decomposition of the supplied monochloride is effected in the decomposer region, so that the gas discharged therefrom consists substantially wholly of aluminum trichloride and is essentially free of monochloride.

It has been found that in subhalide decomposer operation, e.g. of the character described above, minute droplets or particles of aluminum metal tend to form in the gas flow in the decomposer region and to be carried therewith from the latter region as an aluminum aerosol or fog. Such production of aluminum fog is particularly extensive when the temperature differential between the cooling surface and the subhalide-containing gas flow in the decomposer region is large. In other respects, operation with a large cooling surface-gas temperature differential is advantageous, because when the latter temperature differential is at a maximum, the rate of subhalide decomposition is at a maximum and hence the size of decomposer equipment required (i.e. for treatment of converter exit gas supplied thereto at any given rate) is at a minimum; that is to say, by operating the decomposer with a large temperature differential, decomposer equipment size may be minimized, affording important savings in cost and space. However, the presence of aluminum fog in the decomposer outlet gas, i.e. in the normal halide gas recycled from the decomposer to the converter, has heretofore occasioned serious difficulties in that the fog tends to condense in and rapidly block the path of the circulating normal halide gas flow downstream of the decomposer.

It is accordingly an object of the present invention to provide new, improved and economical procedures for decomposing aluminum subhalide gas, wherein the aluminum normal halide gas advanced through the gas circulation system downstream of the decomposer region is essentially entirely free of aluminum fog. Another object is to provide such procedures enabling maintenance of a large temperature differential between the cooling surface and the gas in the decomposer region without blockage of the gas circulation system downstream of the decomposer region by aluminum fog. A further object is to provide procedures and apparatus for decomposing aluminum subhalide gas affording essentially complete removal of aluminum fog from the decomposer outlet gas in a facile and convenient manner. A still further object is to provide such procedures and apparatus wherein the removed fog is collected in a molten body and wherein dross accumulation on such molten body is simply and effectively controlled.

To these and other ends, the process of the invention in a broad sense contemplates effecting decomposition of aluminum subhalide gas by cooling a flow of subhalide-containing gas at a first locality to a temperature above the melting point of aluminum (which is about 660° C.), conducting the decomposer exit gas at the latter temperature to a second locality, and removing aluminum fog from the decomposer exit gas at the second locality by coalescing the fog droplets at a temperature above the melting point of aluminum. In this way, i.e. by maintaining the gas temperature above the melting point of aluminum until the fog droplets are coalesced, the droplets remain in liquid state and are collected as a liquid;

thus removal of the collected fog is facilitated and no blockage of equipment by solid condensation of fog occurs. The gas advanced from the decomposer to the converter is essentially completely fog-free even in cases of extensive fog formation, and accordingly, the decomposition operation may be performed with a large temperature differential between the cooling surface and the gas flow, as desired for economy of decomposer equipment size and cost.

In certain particularly effective embodiments of the present process, the invention contemplates effecting subhalide decomposition by cooling the gas with a splashed body of molten aluminum as generally described above, coalescing the fog in the decomposer outlet gas in a fog-removal chamber having communication with the decomposer region, collecting the coalesced fog in a pool or body of molten aluminum in the latter chamber, and effecting continuous circulation of molten aluminum between the fog-removal chamber pool and the molten body of aluminum in the decomposer region. Thereby the collected aluminum fog is added to the main molten body, for recovery as part of the product; and in addition, accumulation of dross on the collected body of fog is controlled in a simple and convenient manner, this dross being drawn with the molten aluminum into the main body in the decomposer region from which the dross may readily be removed as by procedures heretofore proposed.

Further features and advantages of the invention will be apparent from the detailed description hereinbelow set forth, together with the accompanying drawings, wherein:

FIG. 1 is a simplified side elevational sectional view of an aluminum subhalide decomposer incorporating one embodiment of the apparatus of the present invention;

FIG. 2 is a sectional view of the apparatus of FIG. 1, taken along the line 2—2 of FIG. 1;

FIG. 3 is a sectional view of the apparatus of FIGS. 1-2 taken along the line 3—3 of FIG. 2;

FIG. 4 is a simplified elevational sectional view of another embodiment of the apparatus of the invention;

FIG. 5 is a sectional view of the apparatus of FIG. 4 taken along the line 5—5 of FIG. 4;

FIG. 6 is an elevational sectional view of an alternative form of fog-removal apparatus suitable for use in the present process;

FIG. 7 is a plan view, partly broken away, of the apparatus of FIG. 6;

FIG. 8 is a schematic sectional view of another fog-removal arrangement suitable for use in the present process; and FIG. 9 is a schematic sectional view of a further fog-removal arrangement suitable for use in the present process.

Referring first to FIGS. 1–3, there is shown, as an example of decomposer equipment in which the apparatus of the invention may be incorporated, a two-stage decomposer 10 adapted for use in the subhalide distillation of aluminum to decompose aluminum subhalide gas produced by reaction of aluminum normal halide gas with crude aluminum-containing alloy as in a converter (not shown) of conventionally proposed design. This decomposer 10 generally comprises a refractory material structure 11, e.g. built up of refractory brick, having a metallic outer shell 12. The interior of the decomposer constitutes first and second enclosed chambers respectively designated 14 and 15, interconnected by a passageway 17 and each adapted to be partially filled with molten aluminum 19, i.e. to a common level 20 such that the molten metal extends through the lower part of the passageway 17.

The space above the level 20 in each of the chambers is adapted to accommodate the flow of gas to be treated. This flow, containing aluminum subhalide gas ordinarily in mixture with a substantial proportion of aluminum normal halide gas, is delivered to the decomposer 10 from the aforementioned converter through a conduit 22 opening into chamber 14; the gas flow advances through the decomposer from right to left (as seen in FIGS. 1 and 2), successively traversing chamber 14, passageway 17 and chamber 15, and leaves the decomposer through a gas outlet arrangement 24 (hereinafter further described) opening at the left-hand end wall of chamber 15.

Means are provided in each of the chambers 14 and 15 for splashing or spraying the molten aluminum 19 through the gas-filled upper regions of these chambers so as to afford extended, intimate contact between the gas flow and the molten metal and thereby to cool the gas to effect decomposition of the aluminum subhalide. Specifically, the latter means include a first pair of screw lifts 25a and 25b positioned in the chamber 14 on opposite sides of the passageway 17 adjacent the left-hand end wall of the chamber, and a second pair of screw lifts 26a and 26b positioned in the chamber 15 on opposite sides of the opening of gas outlet 24 adjacent the left-hand end wall of chamber 15.

Screw lift 25a, as shown, comprises an axially vertical torque shaft 27 bearing on its outer surface a pair of preferably integrally formed, upwardly opening helical channels 30a and 30b of left-handed sense concentric therewith, the channels being arranged as a double helix and each having a channel depth which decreases with ascending position thereof on the shaft. The screw lift, which may for example be fabricated of graphite, is rotatably mounted in the top of the chamber 14 and extends downwardly therefrom through substantially the entire vertical extent of the chamber, the lower portion of the screw lift being immersed in the molten aluminum 19. Drive means 32 are provided for the screw lift 25a, mounted on the exterior of the decomposer so as to be operatively connected to the latter screw lift and adapted to effect rotation thereof in a counterclockwise direction. Screw lift 26a in chamber 15 is identical with screw lift 25a and is provided with similar drive means 33 for effecting counterclockwise rotation of screw lift 26a. Screw lifts 25b (in chamber 14) and 26b (in chamber 15) are similar in construction and arrangement to screw lifts 25a and 26a but have right-handed sense helical channels and are provided with drive means (not shown) for effecting their rotation in a clockwise direction.

Upon rotation of the screw lifts in the stated directions, molten aluminum rises in the helical channels and is thrown out tangentially by centrifugal force into the gas-filled upper regions of the chambers. The decreasing capacity of the channels with ascent is adapted to keep the channels full despite loss of liquid, so that each brimming channel is capable of spinning off centrifugal spray at all axial heights; this effect causes an even spray throughout the gas-filled regions of the chambers.

With each of the above-described screw lifts there is associated a concave arcuate baffle portion of the refractory wall 11 adapted to restrict the directions in which spray is thrown off from the screw lifts. Thus, screw lift 25a is closely and concentrically surrounded on one side (viz. the side adjacent the nearest corner of chamber 14) by an arcuate baffle portion 34, curved about a vertical axis and extending for at least substantially the entire vertical extent of the screw lift in the gas-filled upper region of chamber 14, sufficient clearance being provided between the screw lift and baffle portion to enable free rotation of the screw lift. The baffle portion 34 conforms closely to a limited arcuate portion of the circular outline of screw lift 25a, e.g. an arc of about 135° extending from a point on screw lift 25a whose tangent lies directly across the opening of passageway 17 to a point whose tangent lies in the general direction of the gas inlet to the chamber. A corresponding but oppositely oriented baffle portion 35 is provided for screw lift 25b in chamber 14, and like baffle portions 36 and 37 are respectively provided for screw lifts 26a and 26b in chamber 15. These baffle portions cooperate with the screw lifts rotating in the stated directions to direct the spray, thrown off by the screw lifts, through a range of directions as indicated (by way of example) by double-headed arrows in chamber 15 in FIG. 2, i.e. so that the progressively released spray travels in a broad arc of directions between a direction transverse to the advancing gas flow and a direction substantially countercurrent to the advancing gas flow.

For initial gas-liquid contact, a further screw lift 38, similar in structure and arrangement to those already described and rotated by drive means 39, but lacking a baffle, may be positioned in the chamber 14 adjacent the gas inlet conduit 22, as shown in FIG. 1.

Means are provided for removing heat from the molten aluminum in each of chambers 14 and 15 so as to control the temperature thereof. The heat-removing means in chamber 14, as shown, includes a shroud 40 (e.g. fabricated of refractory material) surrounding the lower end of screw lift 25b so as to define a pool region 41 which is laterally separated from the main body of molten aluminum in the chamber; an aluminum inlet passage 43 opening through the side wall of chamber 14 adjacent screw lift 25b and below the level of molten aluminum, for conducting molten aluminum into the pool region 41 from an external cooling well (not shown); and an aluminum outlet passage 44 opening through the same side wall of chamber 14, also below the molten aluminum level, for conducting molten aluminum from the chamber to the latter well. In this cooling arrangement, heated molten aluminum from the molten body 19 in chamber 14 flows outwardly through passage 44 to the cooling well, where it is cooled by any appropriate technique; the rotating screw lift 25b draws the cooled molten metal into pool region 41 from the cooling well through passage 43 and picks up and sprays the cooled metal through chamber 14 thereby returning it to the main body 19, so as to provide continuous circulation of molten aluminum between the body in chamber 14 and the cooling well. Thus heat, transferred to the molten metal in chamber 14 from the converter exit gas flow and the exothermic subhalide decomposition reaction therein, is continuously removed from the molten metal in the cooling well, enabling the temperature of the molten body in chamber 14 to be maintained at any desired value.

The cooling means in chamber 15, as shown, may be essentially identical to that in chamber 14, comprising a shroud 45 surrounding the lower end of screw lift 26a, a molten metal inlet passage 46, and a molten metal outlet passage 47, arranged as in the manner described above in cooperation with an external cooling well (not shown) to provide continuous removal of heat from the main molten body in chamber 15. This latter cooling means, including the external cooling well, may be entirely separate from that of chamber 14, so that the molten aluminum temperature in chamber 15 may be maintained at a different (e.g. lower) temperature from that in chamber 14.

The foregoing arrangement in decomposer apparatus of screw lifts, baffles, shrouds and aluminum inlet and outlet passages is generally as described in the copending application of Norman W. F. Phillips, Bryan Rapson and Frederick William Southam, Ser. No. 407,760, filed Oct. 30, 1964 and now Patent No. 3,311,363, issued Mar. 28, 1967, for Gas-Liquid Contact Apparatus.

The decomposer of FIGS. 1–2 further includes means for removing dross from the surface of the molten aluminum body 19, such means as shown being generally of the type described in the copending application of Henry James Howie, Thomas Barnett Rance, Bryan Rapson and Frederick William Southam, Ser. No. 368,456, filed May 15, 1964, for Process and Apparatus for Separation of Materials from Liquid. In this connection it may be explained that dross, produced in the decomposer by reaction of aluminum with impurities introduced to the distillation system in or with the crude aluminum-containing alloy in the converter (such dross appearing to consist for the most part of aluminum oxide, aluminum nitride and aluminum carbide), tends to float and accumulate on the surface of the molten aluminum body 19; this dross, if allowed to build up, would impair the efficiency of the decomposer and would also encrust the refractory walls.

Specifically, the illustrated dross removal means includes a shroud 50 (e.g. fabricated of refractory material), disposed in a corner of the chamber 14 formed by one side wall thereof and an inwardly projecting portion 52 of the same side wall, at a locality spaced from the screw lifts 25a and 25b in the direction of the gas inlet conduit 22, and cooperating with the chamber walls to define a laterally enclosed pool region 53. The top of shroud 50 is slightly below the molten aluminum level 20, so that molten aluminum from the main body 19 can flow into pool 53. An outlet passage 55 leads from pool 53 through the side wall of the decomposer to an external well (not shown) and a corresponding inlet passage 56 leads from this well back into the chamber 14 at a locality spaced from the shroud 50.

A pumping screw 58 extends downwardly from the top of chamber 14 into the pool 53 and bears at its lower end (within the pool 53) a pair of helicoidal screw flights 60. This pumping screw is rotated by drive means 61, mounted on the exterior of the decomposer, in such direction that the rotational movement of helicoidal flights 60 draws molten aluminum, together with dross, from the body 19 down into the pool 53 and forces the aluminum and dross out through passages 55 to the external well. In the latter well, the dross rises to the top surface of the molten metal and is skimmed off and disposed of in any convenient manner, the dross-free molten metal being returned to the main body in chamber 14 through passage 56. The rotation of screw lifts 26a and 26b in chamber 15, and also of screw lifts 25a and 25b in chamber 14, promotes flow of dross toward the dross removal screw 58, the dross from chamber 15 flowing into chamber 14 through passageway 17 on the surface of the molten body 19 extending therethrough; hence the operation of screw 58 is effective to control accumulation of dross throughout the decomposer 10.

As incorporated in the foregoing decomposer structure, the apparatus of the present invention is arranged to effect removal of aluminum metal fog (produced in the flow of gas in the decomposer incident to the subhalide-decomposing operation) from the flow of gas leaving the decomposer chamber 15. Specifically, in accordance with the invention, means are incorporated in the gas outlet arrangement 24 of the decomposer for separating such fog from the decomposer exit gas prior to advance of the gas from the decomposer through the aluminum normal halide gas circulation system (not shown) which returns the latter gas to the converter.

In the embodiment of FIGS. 1–3, this fog removal means broadly comprises a cyclone separator generally designated 65, disposed within the decomposer structure to the left of chamber 15 as seen in FIGS. 1 and 2. The cyclone 65 includes an axially upright cylindrical chamber 67, formed within the refractory material structure 11 of the decomposer (e.g. having walls constructed of any stable refractory such as alumina, silicon carbide, silicon nitride-bonded silicon carbide, or graphite) and having a vertical extent substantially coextensive with the portion of chamber 15 adjacent screw lifts 26a and 26b. This chamber 67 is disposed to the left of the left-hand end wall of chamber 15 as seen in FIGS. 1 and 2, at a locality generally intermediate the two screw lifts in the latter chamber. The upper end of cyclone chamber 67 communicates with decomposer chamber 15 through a gas passage 68, of restricted cross-sectional dimension, which extends along a horizontal axis from the left-hand end wall of chamber 15 to chamber 67; the axis of passage 68 is oriented at an angle to the long axis of the decomposer 10 so as to conduct the gas flow from chamber 15 to chamber 67 in a direction tangential to the cylindrical wall of chamber 67, and so that the inlet end of passage 68 (in chamber 15) points generally toward screw lift 26a.

A cylindrical gas outlet pipe 70, having a diameter smaller than that of chamber 67, extends upwardly from the top of the latter chamber to deliver the decomposer outlet gas to the aforementioned gas circulation system. The pipe 70, which may be fabricated, for example, of graphite, also projects downwardly into chamber 67 coaxially therewith and opens at a level below that of passage 68 but nevertheless substantially above the bottom of chamber 67, an annular space 72 being thereby defined (i.e. between the wall of chamber 67 and pipe 70) in the upper portion of chamber 67 at the level of passage 68.

The chamber 67, passage 68 and pipe 70 as thus arranged cooperate to constitute a cyclone separator for separation of an entrained aerosol from a gas stream and, in a broad sense, function in the known manner of such devices. The fog-carrying gas flow from decomposer chamber 15 is injected tangentially through passage 68 into the annular space 72 at the top of the cylindrical chamber 67, and the gas then traverses a spiral path (through the annular space) at substantial velocity, before entering the open lower end of the outlet pipe 70 through which it passes into the gas circulation system. As angular motion is thus imparted to the gas flow entering chamber 67, the contained fog droplets are in effect centrifuged out of the gas stream; they impinge against the side wall of chamber 67 where they coalesce and run down to collect in a pool 74 of molten aluminum at the lower end of chamber 67.

Further in accordance with the invention, continuous circulation of molten aluminum is provided between this pool 74 and the main molten body 19 in the decomposer. To this end, a shroud 76 (e.g. of refractory material) is disposed adjacent screw lift 26b in chamber 15, surrounding the lower end of the latter screw lift and extending to the floor of the decomposer from a level below the level 20 of molten aluminum therein. The shroud is attached to the adjacent refractory walls 11 so as to laterally enclose a pool 77 into which the lower end of screw lift 26b extends, and from which molten aluminum can be exchanged with the main body 19. A passage or tunnel 79 (FIG. 3) extends from the lower end of the cyclone chamber 67 into the pool 77; thus as the screw lift 26b rotates, raising molten aluminum up from the pool 77, it draws molten aluminum into the latter pool through tunnel 79 from the pool 74 in chamber 67.

In addition, the inlet end of gas passage 68 is provided with an extension or deflector portion 80, e.g. fabricated of refractory material, which projects into chamber 15 on the side of passage 68 opposite to the screw lift 26a. This deflector portion 80 is positioned to intercept and deflect into passage 68 a portion of the molten aluminum spray thrown off by screw lift 26a, as indicated by double-headed arrow 81. In this way there is provided a continuous supply of molten aluminum to the pool 74 in chamber 67 from the main body 19 in the decomposer. By virtue of the circulation of molten aluminum thus effected through cyclone chamber 67, accumulation of dross on the surface of the pool 74 therein is prevented, the dross being withdrawn (together with molten metal) through passage 79 by the action of screw lift 26b and delivered to the chamber 15 from which this dross is advanced to dross removal screw 58 as already described. Withdrawal of molten aluminum from chamber 67 by screw lift 26b also lowers the metal level in chamber 67 thereby increasing the active length of the cyclone.

As a specific example of construction of the cyclone 65, the chamber 67 may have an internal diameter of 27.2 inches and a vertical height of about 52 inches; pipe 70 may have an internal diameter of 13.6 inches and project downwardly into chamber 67 for a distance of 17.0 inches, passage 68 having a vertical internal dimension of 13.6 inches with the top of passage 68 being at the same level as the top of chamber 67. This exemplary cyclone unit is designed to operate at a pressure drop of 30 mm. of mercury at a flow rate of 20,000 lbs./hr. of aluminum trichloride gas. It is adapted for use with a decomposer (in the arrangement shown in FIGS. 1–2) having a chamber 15 about 67 inches long, 56 inches high, 68 inches wide in its lower (aluminum-filled) portion and 78 inches wide in its upper (gas filled) region; having an over-all internal length (total length of chambers 14 and 15) of about 19 feet; and containing molten aluminum in chambers 14 and 15 to a depth of about 20 inches.

In performing the process of the present invention with the above-described apparatus, the body of molten aluminum 19 is established in chambers 14 and 15 and, as the screw lifts and dross screw are continuously rotated, heated gas comprising aluminum subhalide gas together with unreacted aluminum normal halide gas, as discharged from the aforementioned converter, is delivered in continuous flow to the decomposer through conduit 22. As this gas flow traverses the decomposer, it is cooled by contact with the intense metal spray provided by the screw lifts in chambers 14 and 15, so that the contained subhalide gas decomposes into aluminum metal (which is deposited in the molten body 19) and reconstituted aluminum normal halide gas. The molten metal in each of chambers 14 and 15 is maintained at the desired temperature for each chamber by continuous circulation through the respective cooling circuits of the chambers. Dross floating on the aluminum surface in chambers 14 and 15 is driven by the action of the screw lifts toward the dross pumping screw 58, which removes the dross through pool 53 and passage 55. Portions of the body 19 may be tapped off from time to time (as through outlet 83 in chamber 15) to constitute the purified aluminum metal product of the subhalide distillation process.

During such operation, and especially when a large temperature differential is maintained between the gas flow and the molten aluminum in the decomposer, an aluminum fog comprising minute droplets or particles of aluminum metal is produced in the gas flow as it traverses the decomposer. Essentially complete decomposition of aluminum subhalide gas occurs in chambers 14 and 15, so that at the left-hand end of chamber 15 the gas flow consists substantially wholly of aluminum normal halide gas, including unreacted normal halide delivered from the converter and reconstituted normal halide produced in the decomposer. This gas, containing aluminum fog, leaves chamber 15 through passage 68 together with a portion of the molten aluminum spray thrown off by screw lift 26a and is directed by passage 68 tangentially into the upper end of cylindrical chamber 67. In the latter chamber, as the gas follows a spiral path through annular space 72, the contained fog droplets impinge against and coalesce on the walls of chamber 67 and run down these walls to collect in pool 74. In this way essentially complete removal of aluminum fog from the gas is effected, so that the flow of aluminum normal halide gas departing through outlet pipe 70 (for recirculation to the converter) is essentially free of fog.

The temperature of the molten metal in chamber 15 is controlled so that the gas (and contained fog) leaving the chamber through passage 68 is at a temperature at least slightly above the melting point of aluminum. Similarly, the surfaces of cyclone 65 including the walls of chamber 67 on which the fog droplets coalesce are maintained above the melting point of aluminum, the temperature of the gas and molten metal supplied to the cyclone through passage 68 being sufficiently high to maintain these surfaces at the requisite temperature during operation as described above. As a result, the droplets or particles of aluminum fog remain in liquid state and coalesce on the walls of chamber 67 as a liquid; hence there is no blockage of the equipment due to accumulation of solid condensed aluminum fog.

The molten aluminum splashed into chamber 67 by screw lift 26a, as well as the coalesced fog, collects in pool 74 at the bottom of chamber 67 from which aluminum and dross are continuously withdrawn through passage 79 by the action of screw lift 26b. In this way, dross accumulation on the surface of pool 74 is prevented, the successive supply of splashed aluminum and withdrawal of aluminum to chamber 15 being effective to carry the dross as well as the molten metal out of chamber 67. As the dross from pool 74 returns to chamber 15, it floats to the surface of the molten aluminum therein and is driven by the action of screw lift 26b toward the dross removal screw 58 in chamber 14 for removal from the decomposer.

In the described operation of the apparatus of FIGS. 1–3, as stated above, the surfaces of cyclone 65 are maintained at the requisite temperature for collection of the aluminum droplets in liquid state by the heated gas and molten aluminum passed therethrough, so that there is normally no need for supplemental heating of the cyclone. On start-up of operation, or in periods of no gas flow, heating is effected (as in the decomposer itself) by circulation of heated molten aluminum from an external source through the decomposer and cyclone chambers, with additional forced circulation of the molten metal provided, when required, by the screw lifts. For example, the apparatus of FIGS. 1–3 may be provided with an attached oil-fired aluminum holding furnace (not shown) from which heated molten metal can be circulated to the decomposer or cyclone chambers when required.

By way of specific example of the foregoing process as performed in the apparatus of FIGS. 1–3, the converter outlet gas delivered to the decomposer through conduit 22 may comprise aluminum monochloride together with unreacted aluminum trichloride, for example at a temperature of about 1100° C. or higher, e.g. up to 1200° or even 1250° C.; it may be noted that fog production in the decomposer tends to increase with increasing converter gas outlet temperature. For decomposition of the monochloride in this gas, the molten aluminum in the first chamber 14 may be maintained at a temperature between about 1000° C. and about 1050° C., and the molten aluminum in the second chamber 15 may be maintained at a temperature of about 700° C. Thus the gas departing from chamber 15 through passage 68 consists substantially wholly of aluminum trichloride and is at a temperature of about 700° C., i.e. somewhat above the melting point of aluminum. Accordingly the aluminum fog droplets or particles carried in the latter gas are in liquid state and coalesce as a liquid in cyclone 65.

In FIGS. 4 and 5 there is illustrated an alternative embodiment of the apparatus of the invention incorporating, in a decomposer as shown in FIGS. 1–2, a modified form of fog removal structure, i.e. in place of the cyclone 65 of FIGS. 1–3. For simplicity, the decomposer structure is omitted in FIGS. 4–5, except for the left-hand portion (i.e. the gas outlet end) of chamber 15, and it will be understood that the decomposer 10 in FIGS. 4–5 may be identical in construction and arrangement to that shown in FIGS. 1–2 and described above, except as hereinafter noted.

Specifically, in the apparatus of FIGS. 4–5, the fog-removal arrangement, through which the decomposer outlet gas passes, comprises an impingement scrubber 85 of the so-called Doyle type. This impingement scrubber 85 includes an upright enclosed scrubber chamber 87 formed within the refractory material structure 11 of the decomposer 10 (e.g. having walls constructed of a stable refractory such as the materials mentioned above for construction of the chamber 67 of FIGS. 1–3) and positioned in generally the same relation to other parts of the decomposer as the cyclone chamber 67 in FIGS. 1–3. Thus, chamber 87 is disposed to the left of the left-hand end wall of decomposer chamber 15 at a locality generally intermediate screw lifts 26a and 26b in the latter chamber, the floor of chamber 87 being at substantially the same level as the floor of chamber 15. The chamber 87 is adapted to be partially filled with a pool or body 89 of molten aluminum, to a level 90 therein.

The decomposer outlet gas is led into chamber 87 from decomposer chamber 15 through a pipe 92, fabricated of graphite, which extends through the wall portion between chambers 15 and 87 along a horizontal axis e.g. parallel to the long axis of decomposer 10. Pipe 92 includes a portion 93, also of graphite, which projects into chamber 87 and turns downwardly (so that its terminal extent is axially vertical); portion 93 opens downwardly into chamber 87 at a level slightly above the molten aluminum level 90. Chamber 87 extends for some distance above the locality of pipe 92 and communicates at its upper end with a gas outlet conduit 95 through which the decomposer outlet gas is advanced to the gas circulation system (not shown) for return to the aforementioned converter.

In this arrangement of elements, aluminum fog droplets are removed from the decomposer outlet gas by impingement against the molten aluminum surface in chamber 87. That is to say, the gas from chamber 15 is directed downwardly at high speed (by pipe portion 93) against the surface of the molten metal body 89, generating waves in the surface and causing the droplets of fog in the gas to impinge against and coalesce on the latter surface, where they are added to the molten aluminum body 89. The gas, now essentially free of fog, passes through the restricted space between the lower lip of pipe portion 93 and the latter molten aluminum surface, and rises into the upper portion of chamber 87 where it is discharged through outlet conduit 95.

As in FIGS. 1–3, the lower end of screw lift 26b is surrounded by a shroud 76 defining a pool 77 into which the lower end of the screw lift extends, and which communicates with the lower end of chamber 87 through a tunnel 79. Upon rotation of screw lift 26b molten aluminum is continuously withdrawn from the body 89 in chamber 87 through tunnel 79 and returned to the main body of molten aluminum 19 in chamber 15 by the action of the screw lift. Chamber 87 also communicates with chamber 15 through a second, separate passage or tunnel 97, spaced from tunnel 79 and opening below the molten aluminum level in both chambers. As molten metal is withdrawn from chamber 87 through tunnel 79, fresh increments of molten metal flow into chamber 87 through the tunnel 97 from the main body 19 in chamber 15, so as to maintain chamber 87 filled with molten aluminum to the desired level 90. In this way there is provided continuous circulation of molten aluminum through chamber 87; accumulation of dross on the molten aluminum surface in the latter chamber is thereby prevented, the dross being withdrawn together with molten metal through tunnel 79 and returned to chamber 15 where it is driven toward the decomposer dross removal screw (not shown in FIGS. 4 and 5) by the action of screw lift 26b.

Such removal of dross from the molten body 89 is important, as the dross if allowed to accumulate would impair the efficacy of the scrubber in removing fog and would also encrust the interior of chamber 87. Alternative dross-removal arrangements may, if desired, be provided in the embodiment of FIGS. 4–5. For instance, in place of tunnel 79 and shroud 76, a dross removal screw and associated shroud (not shown), similar to screw 58 and shroud 50 in decomposer chamber 4 as shown in FIGS. 1–2, may be disposed within chamber 87 itself for delivery of dross and molten metal therefrom directly to an external well (not shown), dross-free molten metal being returned from the latter well to chamber 15, for example and fresh increments of molten metal being supplied to chamber 87 through tunnel 97 from chamber 15, as before.

In a particular example of construction of the scrubber 85, as incorporated in a decomposer having the exemplary dimensions set forth above in connection with FIGS. 1 and 2, pipe 92 may be 8 inches in internal diameter, the pipe portion 93 also having a diameter of 8 inches; the lower end of the latter pipe portion, in such example, may terminate at a distance of between about 1 inch and about 2 inches above the molten aluminum level 90 in chamber 87.

Performance of the present process with the apparatus of FIGS. 4–5 is essentially similar to that with the apparatus of FIGS. 1–3 described above, except that the fog is removed from the decomposer outlet gas by scrubbing with molten aluminum in chamber 87 (or, in other words, by impingement of the fog droplets on the molten aluminum surface therein) instead of by cyclone action. Thus, the subhalide-containing gas flow from the converter traverses the decomposer where it is cooled by contact with molten aluminum spray for decomposition of the subhalide so that the gas at the outlet (left-hand) end of chamber 15 consists substantially wholly of aluminum normal halide; temperature conditions in the decomposer are controlled, as before, to provide this outlet gas at a temperature above the melting point of aluminum. The internal surfaces of scrubber 85 are also maintained above the melting point of aluminum; as in the apparatus of FIGS. 1–3, the presence of molten aluminum and heated gas in the scrubber ordinarily serves to maintain the scrubber surfaces at the requisite temperature during operation and hence supplemental heating means are normally not required for the scrubber, except that at start-up and during periods of no gas flow the scrubber may be heated by circulation of molten aluminum in the same manner as described above for the cyclone of FIGS. 1–3.

Because the scrubber surfaces are above the melting point of aluminum, the fog droplets carried in the gas remain in liquid state and coalesce as such in the molten aluminum in chamber 87. The gas, i.e. essentially free of fog after traversing the aluminum surface in the latter chamber, is delivered through outlet conduit 95 to the downstream gas circulation system for return to the converter. Dross accumulation in chamber 87 is prevented by the described continuous circulation of molten aluminum therethrough.

While the apparatus of the invention in the foregoing embodiments has been shown and described as incorporated in a two-chamber splash decomposer, it will be appreciated that the decomposer may have a larger number of chambers if desired. Indeed, even in cases of decomposer operation under conditions such that formation of aluminum fog does not normally occur, provision of fog-removal structures in accordance with the invention for treatment of the decomposer outlet gas is advantageous as ensuring against downstream blockage of the normal halide gas circulation system in the event of unexpected fog formation.

However, a special advantage of the invention is that it enables decomposer operation under conditions resulting in extensive fog formation. That is to say, because it affords effective and essentially complete removal of fog and thus overcomes the problems heretofore presented by formation of aluminum fog in subhalide decomposition, the invention enables decomposer operation with a large temperature differential between the cooling surface and the gas flow, as illustrated by the above example of operation wherein gas entering the decomposer at 1100° C. or above, e.g. 1200° or even 1250° C., is exposed in chamber 14 to molten metal at 1000°–1050° C. and in chamber 15 to molten metal at 700° C. Under the latter conditions, two decomposer contact zones or chambers are ordinarily sufficient to accomplish the desired decomposing action; and a two-chamber decomposer possesses significant advantages with respect to decomposer equipment size and cost over decomposers having a greater plurality of chambers. Therefore important particular features of the invention, in a specific aspect thereof, reside in decomposer operation at a large temperature differential as exemplified above and in the employment of such relatively small and economical decomposer equipment, i.e. a two-chamber decomposer as shown. Indeed, by appropriate selection of decomposer design and conditions of operation, a single-chamber decomposer may be used in the practice of the invention.

In its broader aspects, the invention may be practiced with types of decomposer equipment other than the molten aluminum splash decomposer shown, and the process of the invention embraces fog-removal treatment of the decomposer outlet gas at a locality external to the decomposer structure, with or without circulation of molten aluminum between such locality and the interior of the decomposer. One form of fog-removal arrangement suitable for use in the practice of the present process to treat decomposer outlet gas at a locality external to a decomposer is shown in FIGS. 6 and 7.

The apparatus of FIGS. 6–7 comprises, in combination with an aluminum subhalide decomposer 100 (which may be of any appropriate type, e.g. a two-stage molten aluminum splash decomposer as shown at 10 in FIGS. 1–2 but lacking fog-removal means in the gas outlet 24), a bank of cyclone separators generally designated 101 arranged to receive the gas, i.e. aluminum normal halide gas, discharged from decomposer 100 through conduit 102. Specifically, cyclone bank 101 includes five cyclone separators 104 mounted in axially vertical side-by-side relation in a common housing 105.

Each of the cyclones 104 is constituted by an upright cylindrical chamber 107, an axially horizontal passage 108 for directing gas tangentially into the upper end of chamber 107, and an axially vertical gas outlet pipe 109 extending upwardly from the upper end of chamber 107 and projecting downwardly into chamber 107 to open downwardly therein at a level below the level of passage 108. The latter downward projection of pipe 109 has an external diameter smaller than the internal diameter of chamber 107 and is coaxial with the latter chamber, so that an annular space 111 is defined between the wall of chamber 107 and pipe 109 at the locality of introduction of gas through passage 108.

The gas from decomposer 100 advances through an inlet nozzle 112 into an axially horizontal main inlet duct or distributing passage 114 which extends transversely of the bank of cyclones 104. The inlet passage 108 of each cyclone communicates with the distributing passage 114, so that the gas flowing through the latter passage is divided among the five cyclones, which are thus arranged in parallel to treat the gas. Similarly, the outlet pipes 109 of all the cyclones deliver the gas into a common outlet duct 116 extending transversely above the cyclone bank; from duct 116 the treated gas passes through outlet nozzle 117 into the gas circulation system (not shown) of the subhalide distillation system for return to the converter (not shown).

The cylindrical chamber 107 of each cyclone opens downwardly into a discharge throat 118 providing an axially vertical passage of extended and downwardly tapering frustoconic configuration, and terminating at its lower end in a discharge nozzle 119. The nozzles 119 of the five cyclones open downwardly into a common trough 120, which extends transversely below the five cyclones.

In this arrangement, the decomposer outlet gas (containing aluminum fog droplets) flows through passage 114, which distributes this gas among the cyclones. The gas entering each cyclone chamber 107, i.e. directed tangentially thereof by the passages 108, follows a spiral path through the upper portion of the cyclone chamber, and the aluminum fog droplets are centrifuged out of the gas; these droplets thus impinge against and coalesce on the walls of chamber 107, whence they flow down through throat 118 and nozzle 119 into the trough 120. A pool or body 122 of molten aluminum, to which each of the cyclones contributes, accumulates in trough 120, and may be tapped off from time to time in any suitable manner. The aluminum normal halide gas, essentially free of fog, flows upwardly from the cyclones through outlet passages 109 into the common outlet duct 116 and through nozzle 117 to the gas circulation system.

Conveniently, the structures constituting the cyclones, discharge throats and nozzles, and inlet and outlet ducts are fabricated of graphite. Suitable means are provided for heating the cyclone surfaces exposed to the gas and coalesced aluminum fog to maintain these surfaces at a temperature above the melting point of aluminum so that the fog droplets remain in liquid state as they coalesce and collect in pool 122. Such heating means may, for example, comprise a plurality of graphite rod resistors 123 extending across the interior of the cyclone housing 105 through the spaces between the graphite cyclone bodies. Each of these resistors 123 is provided at its ends with graphite studs 124a and water-cooled steel studs 124b; the steel studs 124b are threaded into the graphite studs 124a, which have conical-shaped recesses into which the ends of the graphite rod resistors 123 fit. The latter resistors are heated by passage of alternating electric current therethrough from a suitable power source (not shown), connected to the resistors 123 through the steel studs 124b.

Each of the cyclones may also be provided with a valve 125 adapted to close off the upper (outlet) end of pipe 109 when the cyclone is not in use.

In performing the present process with the apparatus of FIGS. 6–7, a flow of subhalide-containing converter exit gas is passed through decomposer 100 where the subhalide is decomposed by cooling to yield aluminum metal and aluminum normal halide gas, temperature conditions in the decomposer being controlled so that the exit temperature of the gas flow therefrom is above the melting point of aluminum. The decomposer outlet gas, consisting substantially wholly of aluminum normal halide and carrying aluminum fog droplets, is delivered to the bank of cyclones where the fog droplets are coalesced, as described above, on the cyclone surfaces at a temperature above the melting point of aluminum and collected in pool 122, the fog-free normal halide gas being discharged from the cyclone bank for recirculation to the converter of the subhalide distillation system. The cyclones 104, as stated, effect essentially complete removal of aluminum fog from the gas; accordingly, as in the apparatus embodiments of FIGS. 1–3 and 4–5, the present process enables decomposer operation under conditions of high cooling surface-gas temperature differential and hence can afford substantial savings in decomposer equipment size and cost.

By way of specific example, the cyclone bank 101 in the system of FIGS. 6–7 may comprise a bank of five graphite cyclones 104 arranged in parallel to treat decomposer outlet gas, one of the cyclones being a spare which is not normally used. In this example, the cylindrical chamber 107 of each cyclone has an internal diameter of 18 inches and a height of 3 feet. Inlet conduit 108 is rectangular in internal cross-section with a vertical dimension of 9 inches and a transverse horizontal dimension of 4½ inches; outlet pipe 109 has a diameter of 9 inches, and the outlet pipe 109 projects down into chamber 107 for a distance of 11¼ inches (i.e. opening into chamber 107 at a distance 2¼ inches below the lowest point of passage 108). The discharge throat 118 of each cyclone has a vertical extent of 2 feet 10½ inches; this throat tapers downwardly to an internal diameter of 4½ inches which is also the internal diameter of discharge nozzle 119. The graphite rod resistors 123 are 1.5 inches in diameter and draw a current of about 2000 amperes. The described cyclones operate at a pressure drop of 10 mm. of merucry. The four normally operating cyclones in the bank, having the foregoing dimensions, together are used to treat decomposer outlet gas (i.e. aluminum trichloride, $AlCl_3$) flowing at a rate of 20,000 lb./hr., to remove between 40 and 100 lb./hr. of aluminum fog therefrom.

While the fog-removal step of the present process has been described above as performed in a cyclone separator or impingement scrubber, this step may also be carried out in other ways. For instance, the fog droplets may be coalesced and removed from the decomposer outlet gas by bubbling the fog-containing gas through one or more layers of molten aluminum, although structures providing such bubbling action tend either to be larger than cyclone and impingement scrubber structures or to operate at a higher pressure drop than the latter structures.

One example of a bubbling arrangement suitable for the present process is illustrated schematically in FIG. 8. This structure comprises a tower 128 having mounted therein one or more so-called bubble cap trays each constituted by a horizontal tray or plate 129 which extends across the interior of the tower at a locality spaced above the lower end of the tower, and which bears on its upper surface a layer 130 of molten aluminum. Plate 129 has a plurality of apertures 131; with each of these apertures there is associated a tubular riser 132 mounted on and projecting above the plate and cooperating with aperture 131 to define a passage for gas flow through the plate. The upper end of each riser 132 extends above the level of the molten aluminum layer 130. A cap 134 is mounted over the top of each riser 132, this cap being spaced from the upper end of the riser and having a skirt portion 136 extending downwardly to surround the riser 132 on all sides. The lower edge of skirt portion 136 is immersed in the aluminum layer 130 but spaced above the surface of the plate.

Aluminum normal halide gas to be treated, i.e. gas as discharged from a subhalide decomposer, containing aluminum fog and (in accordance with the invention) at a temperature above the melting point of aluminum, is delivered to the tower 128 as through a conduit 138 opening into the tower below plate 129. This gas passes upwardly through apertures 131 and risers 132 into the spacers defined by caps 134, being directed downwardly by the caps through the molten aluminum layer 130 to pass under the lower edges of cap skirts 136 before flowing upwardly through the tower above the aluminum layer. Thus the gas is caused to bubble through the aluminum layer; as it does so, fog droplets coalesce in the molten aluminum, augmenting the quantity of molten metal in the layer. To maintain the layer 130 at the desired level, a weir 139 may be provided at one side of the plate 129, spaced from the wall of the tower 128; molten metal from layer 130 overtopping this weir flows down through a liquid downpipe 139a to collect in a pool 140 at the lower end of the tower, which may be tapped off from time to time. The downpipe 139a extends from the plate 129 down into the pool 140 to form a positive gas seal forcing gas to flow through the plate, i.e. preventing diversion of gas along the path of the descending molten aluminum.

The gas, after bubbling through the layer 130, flows upwardly through the tower, in which further bubblecap trays (not shown) similar to tray 129 may be disposed, being delivered from the top of the tower in essentially fog-free condition for return to the subhalide distillation converter.

Alternatively, as shown in FIG. 9, the tower 128 may be provided with one or more so-called sieve trays 142, i.e. in place of the bubble-cap trays as shown in FIG. 8, for effecting the desired scrubbing contact of molten aluminum with the fog-bearing gas. Each of these sieve trays is a horizontal plate extending across the tower and having a plurality of apertures 143. A layer 144 of molten aluminum is supported on tray 142, being maintained there (i.e. kept from flowing downwardly through the apertures) by surface tension and viscosity forces. As in FIG. 8, the decomposer outlet gas to be treated is introduced to the tower 128 below tray 142, and flows upwardly through the apertures 143, i.e. bubbling upwardly through the molten metal layer 144; as it thus bubbles through the layer 144, the fog droplets coalesce and collect in the molten aluminum in the latter layer. Again as in FIG. 8, as the metal accumulates in layer 144 it flows over a weir 146 and down into pool 140 in the lower end of the tower through a downpipe 147 which opens below the surface of pool 140 to provide a positive gas seal.

While the invention has been described above with particular reference to the distillation of aluminum with aluminum trichloride gas and consequently as involving the decomposition of aluminum monochloride gas, it will be appreciated that the process and apparatus of the invention are also adapted for use in the subhalide distillation of aluminum with other aluminum halide, e.g. aluminum tribromide (i.e. $AlBr_3$), the invention being applied in such case to the decomposition of aluminum monobromide produced by reaction of the tribromide with the crude alloy in the converter. That is to say, in the process and apparatus of the invention, the aluminum halide and subhalide involved may be the halide and subhalide, respectively of a halogen having an atomic weight greater than that of fluorine and less than that of iodine.

Moreover, although the invention has been described as employed in decomposer operation wherein subhalide decomposition is effected by splashing molten aluminum metal in the path of the subhalide-containing gas flow, the present method is also applicable to treatment of decomposer outlet gas, for removal of aluminum fog therefrom, in instances where the decomposition is accomplished in other ways or with other forms of decomposing apparatus. Thus, by way of illustration, the method of the invention may be used to treat fog-bearing normal aluminum halide gas discharged from a decomposer of the type described in the copending application of Norman W. F. Phillips and Frederick William Southam, Ser. No. 300,364, filed Aug. 6, 1963 (the latter application being a continuation-in-part of the application of the same applicants, Ser. No. 236,353, filed Nov. 8, 1962, now abandoned), wherein subhalide decomposition is effected by bringing the subhalide-containing gas from the converter into heat-exchange contact with a molten salt, e.g. by directing the gas and molten salt in countercurrent flow through a packed tower. As examples of such operation, a fog removal unit as shown in FIGS. 6–7, 8 or 9 may be arranged to receive the normal halide gas discharged from such decomposer, to effect removal of aluminum fog from this gas flow in the manner described above.

By way of further and more specific illustration of the process of the present invention, reference may be made to the following examples of actual experimental operation in the decomposition of aluminum monochloride gas:

*Example I*

In an 8-inch diameter single-stage splash decomposer (arranged for decomposition of aluminum monochloride by splash contact with molten aluminum) having a 4-inch diameter screw lift rotating at 1000 r.p.m., and connected to a subhalide distillation converter, it was found that for a gas flow rate of 30 lb./hr. from the decomposer, the aluminum fog flow rate out of the decomposer was 0.10 lb./hr. for a molten metal temperature of 820° C. in the decomposer, and 0.15 lb./hr. for a molten metal temperature of 785° C.

A 1.5 inch internal diameter cyclone having a diameter of 0.375 inch at the lower end of the molten metal discharge cone and an over-all height of 6 inches was connected in the gas outlet from the decomposer. The system was operated at a gas flow rate of 27.5 lb./hr. from the converter and a decomposer metal temperature of 720° C. (with production of aluminum metal in the decomposer at a rate of approximately 4 lb./hr.). The aluminum fog-containing outlet gas (i.e. aluminum trichloride) from the decomposer was passed through the cyclone. It was found that the cyclone effected complete removal of aluminum fog from the decomposer outlet gas.

*Example II*

Using the decomposer apparatus of Example I, again at an aluminum production rate of approximately 4 lb./hr., the fog-containing outlet gas from the decomposer was bubbled under a weir and through a 1-inch depth of molten aluminum. The weir was a hanging refractory wall, dipping into the molten aluminum, under which the gas must bubble to leave the decomposer. On the gas outlet side, a depth of 1 inch of aluminum was maintained. The gas was bubbled through the molten aluminum at 795° C. at a rate of about 3 lb./hr. per inch of weir (i.e. per inch of weir width transverse to the gas flow direction); in the present example the total gas flow rate was 27.5 lb./hr., the weir width being about 9 inches. Complete removal of aluminum fog from the gas was obtained.

*Example III*

Again using the decomposer apparatus of Example I operated at an aluminum production rate of approximately 4 lb./hr., aluminum fog-containing aluminum trichloride gas flowing from the decomposer at a rate of 20 lb./hr. was passed through four 0.375 inch diameter holes (in a sieve tray) in parallel and bubbled through a one-inch depth of aluminum at 715° C. Once more, complete removal of aluminum fog from the gas was achieved.

It is to be understood that the invention is not limited to the specific procedures and embodiments hereinabove set forth but may be carried out in other ways without departure from its spirit.

I claim:

1. In procedure for decomposing aluminum subhalide gas to recover aluminum metal and aluminum normal halide gas, the steps of cooling a flow of gas containing gaseous aluminum subhalide at a first locality to a temperature above the melting point of aluminum, to decompose the subhalide; conducting said flow of gas at said last-mentioned temperature from said first locality to a second locality, said flow of gas as conducted to said second locality carrying droplets of aluminum metal fog; and separating said fog droplets from said flow of gas at said second locality by coalescing said droplets therein at a temperature above the melting point of aluminum, to collect said droplets as a coalesced liquid.

2. In procedure for decomposing aluminum monochloride gas to recover aluminum metal and aluminum trichloride gas, the steps of cooling a flow of gas consisting substantially wholly of aluminum monochloride and aluminum trichloride at a first locality to a temperature above the melting point of aluminum, to effect essentially complete decomposition of the monochloride in said flow; conducting said flow of gas at said last-mentioned temperature from said first locality to a second locality, said flow of gas as conducted to said second locality consisting substantially wholly of aluminum trichloride and carrying droplets of aluminum metal fog; and separating said fog droplets from said flow of gas at said second locality by coalescing said droplets therein at a temperature above the melting point of aluminum, to collect said droplets as a coalesced liquid.

3. In procedure for refining aluminum wherein impure aluminum-containing metallic material is exposed to a flow of aluminum normal halide gas in a confined region at a temperature for reaction of said normal halide gas with aluminum of said metallic material to produce aluminum subhalide gas, the process of decomposing said aluminum subhalide gas to recover purified aluminum metal and aluminum normal halide gas, which comprises: advancing a flow of gas containing said aluminum subhalide gas from said confined region to a first locality; cooling said flow of gas at said first locality to a temperature above the melting point of aluminum, to decompose the subhalide; conducting said flow of gas at said last-mentioned temperature from said first locality to a second locality, said flow of gas as conducted to said second locality including aluminum normal halide gas produced by decomposition of said subhalide gas in said first locality and carrying droplets of aluminum metal fog; separating said fog droplets from said flow of gas at said second locality by coalescing said droplets therein at a temperature above the melting point of aluminum, to collect said droplets as a coalesced liquid and thereby to effect essentially complete removal of said droplets from said flow of gas; and circulating said flow of gas from said second locality to said confined region.

4. In procedure for decomposing aluminum subhalide gas to recover aluminum metal and aluminum normal halide gas, the steps of bringing a flow of gas containing gaseous aluminum subhalide into contact with a cooling surface at a first locality to cool said flow of gas and thereby to decompose the subhalide, said cooling surface being maintained at a temperature above the melting point of aluminum but sufficiently lower than that of the gas flow delivered to said first locality to cause formation of droplets of aluminum metal fog in said flow of gas at said first locality; conducting said flow of gas at a temperature above the melting point of aluminum from said first locality to a second locality; and separating said fog droplets from said flow of gas at said second locality by coalescing said droplets therein at a temperature above the melting point of aluminum, to collect said droplets as a coalesced liquid.

5. In procedure for decomposing aluminum monochloride gas to recover aluminum metal and aluminum trichloride gas, the steps of bringing a flow of gas consisting substantially wholly of aluminum monochloride and aluminum trichloride into contact with a cooling surface at a first locality to cool said flow of gas and thereby to decompose the monochloride, said cooling surface being maintained at a temperature lower than that of the gas flow delivered to said first locality but above the melting point of aluminum; conducting said flow of gas from said first locality at a temperature above the melting point of aluminum to a second locality, said flow of gas as conducted to said second locality consisting substantially wholly of aluminum trichloride and carrying droplets of aluminum metal fog; and separating said fog droplets from said flow of gas at said second locality by imparting to said flow of gas a direction of motion causing said fog droplets to impinge against and coalesce on a surface maintained at a temperature above the melting point of aluminum, thereby to collect said droplets as a coalesced liquid.

6. Procedure according to claim 5, wherein said step of bringing said flow of gas into contact with a cooling surface in said first locality comprises effecting vigorous contact of said gas with liquid material, said liquid material providing said cooling surface.

7. In procedure for decomposing aluminum monochloride gas to recover aluminum metal and aluminum trichloride gas, the steps of bringing a flow of gas consisting substantially wholly of aluminum monochloride and aluminum trichloride into contact with a cooling surface in a confined region to cool said flow of gas and thereby to decompose the monochloride, said cooling surface being maintained at a temperature lower than that of the flow of gas delivered to said confined region but above the melting point of aluminum, said flow of gas after traversing said confined region consisting substantially wholly of aluminum trichloride and carrying droplets of aluminum metal fog; separating said droplets from said flow of gas by conducting said flow of gas from said confined region at a temperature above the melting point of aluminum into a confined cylindrical cyclone chamber along a path tangential to said chamber to impart to said flow of gas angular motion causing said droplets to impinge against and coalesce on the walls of said chamber, said chamber walls being maintained at a temperature above the melting point of aluminum, thereby to collect said droplets as a coalesced liquid in said chamber; and discharging said gas from said chamber after separation of said droplets from said flow.

8. In procedure for decomposing aluminum monochloride gas to recover aluminum metal and aluminum trichloride gas, the steps of bringing a flow of gas consisting substantially wholly of aluminum monochloride and aluminum trichloride into contact with a cooling surface at a first locality to cool said flow of gas and thereby to decompose the monochloride, said cooling surface being maintained at a temperature lower than that of the flow of gas delivered to said first locality but above the melting point of aluminum; conducting said flow of gas from said first locality at a temperature above the melting point of aluminum to a second locality, said flow of gas as conducted to said second locality consisting substantially wholly of aluminum trichloride and carrying droplets of aluminum metal fog; and separating said droplets from said flow of gas by directing said flow of gas downwardly onto the surface of a body of molten aluminum at said second locality to cause said droplets to impinge against and coalesce in said molten body, thereby to collect said droplets in said molten body.

9. In procedure for decomposing aluminum monochloride gas to recover aluminum metal and aluminum trichloride gas, the steps of bringing a flow of gas consisting substantially wholly of aluminum monochloride and aluminum trichloride into contact with a cooling surface at a first locality to cool said flow of gas and thereby to decompose the monochloride, said cooling surface being maintained at a temperature lower than that of the flow of gas delivered to said first locality but above the melting point of aluminum; conducting said flow of gas from said first locality at a temperature above the melting point of aluminum to a second locality, said flow of gas as conducted to said second locality consisting substantially wholly of aluminum trichloride and carrying droplets of aluminum metal fog; and separating said droplets from said flow of gas by bubbling said flow of gas through a body of molten aluminum at said second locality to cause said droplets of fog to coalesce in and collect in said molten body.

10. In procedure for decomposing aluminum subhalide gas to recover aluminum metal and aluminum normal halide gas, the steps of cooling a flow of gas containing gaseous aluminum subhalide in a confined region to a temperature above the melting point of aluminum, to decompose the subhalide; conducting said flow of gas at said last-mentioned temperature from said confined region to a confined chamber containing a body of molten aluminum, said flow of gas as conducted to said confined chamber carrying droplets of aluminum metal fog; separating said fog droplets from said flow of gas in said confined chamber by coalescing said droplets therein at a temperature above the melting point of aluminum so as to cause said droplets to collect in said molten body; discharging said flow of gas, essentially entirely free of aluminum fog, from said confined chamber; and continuously delivering molten aluminum from said molten body, together with dross accumulating thereon, to a locality external to said confined chamber, while separating the dross from the molten aluminum at said external locality and while continuously returning substantially dross-free molten aluminum from said external locality to said confined chamber.

11. In procedure for decomposing aluminum subhalide gas to recover aluminum metal and aluminum normal halide gas, the steps of bringing a flow of gas containing gaseous aluminum subhalide into vigorous contact with a first body of molten aluminum at a first locality while maintaining said first molten body at a temperature lower than that of the flow of gas delivered to said first locality, to cool the flow of gas so as to decompose the subhalide and thereby to deposit aluminum in said molten body; conducting said flow of gas at a temperature above the melting point of aluminum from said first locality to a second locality, said flow of gas as conducted to said second locality carrying droplets of aluminum metal fog; separating said fog droplets from said flow of gas at said second locality by coalescing said droplets therein at a temperature above the melting point of aluminum, to collect said droplets in a second body of molten aluminum in said second locality; and advancing molten aluminum from said second molten body, together with dross accumulating thereon, to said first molten body while removing dross from said first body and while supplying molten aluminum from said first molten body to said second molten body to provide continuous circulation of molten aluminum between said first and second bodies.

12. In a procedure for decomposing aluminum monochloride gas to recover aluminum metal and aluminum trichloride gas, the steps of bringing a flow of gas consisting substantially wholly of aluminum monochloride and aluminum trichloride into vigorous contact with a first body of molten aluminum in a first locality while maintaining said first molten body at a temperature lower than that of the flow of gas delivered to said first localtiy, to cool the flow of gas so as to effect essentially complete decomposition of the monochloride and thereby to deposit aluminum in said molten body; conducting said flow of gas at a temperature above the melting point of aluminum from said first locality to said second locality, said flow of gas as conducted to said second locality consisting substantially wholly of aluminum trichloride and carrying droplets of aluminum metal fog; separating said fog droplets from said flow of gas at said second locality by imparting to said flow of gas a direction of motion causing said fog droplets to impinge against and coalesce on a surface maintained at a temperature above the melting point of aluminum so that said droplets collect in a second body of molten aluminum at said second locality; and delivering molten aluminum from said second molten body, together with dross accumulating thereon, to said first molten body while removing dross from said first molten body and while supplying molten aluminum from said first molten body to said second molten body to provide continuous circulation of molten aluminum between said first and second bodies.

13. In procedure for decomposing aluminum monochloride gas to recover aluminum metal and aluminum trichloride gas, the steps of bringing a flow of gas consisting substantially wholly of aluminum monochloride and aluminum trichloride into vigorous contact with a first body of molten aluminum in a confined region while maintaining said first molten body at a temperature sufficiently lower than that of the gas flow delivered to said confined region to cool the flow of gas so as to effect essentially complete decomposition of said monochloride and also to cause formation of droplets of aluminum metal fog in said flow of gas in said region; separating said fog droplets from said flow of gas by conducting said flow of gas from said confined region at a temperature above the melting point of aluminum into a confined cylindrical cyclone chamber along a path tangential to said chamber to impart to said flow of gas angular motion causing said droplets to impinge against and coalesce on the walls of said chamber, said chamber containing a second body of molten aluminum, and said chamber walls being maintained at a temperature above the melting point of aluminum so that said droplets collect as a coalesced liquid in said second molten body; discharging said flow of gas, essentially entirely free of aluminum fog, from said chamber; and delivering molten aluminum from said second molten body, together with dross accumulating thereon, to said first molten body while removing dross from said first molten body and while supplying molten aluminum from said first molten body to said second molten body to provide continuous circulation of molten aluminum between said first and second bodies.

14. In procedure for decomposing aluminum monochloride gas to recover aluminum metal and aluminum trichloride gas, the steps of bringing a flow of gas consisting substantially wholly of aluminum monochloride and aluminum trichloride into vigorous contact with a first body of molten aluminum in a confined region while maintaining said first molten body at a temperature sufficiently lower than that of the gas flow delivered to said confined region to cool said gas so as to effect essentially complete decomposition of said monochloride and also to cause formation of droplets of alumiunm metal fog in said flow of gas in said region; conducting said flow of gas from said confined region at a temperature above the melting point of aluminum into a confined chamber containing a second body of molten aluminum; separating said fog droplets from said flow of gas by directing said flow of gas in said chamber downwardly onto the surface of said second molten body to cause said droplets to impinge against and collect in said second molten body; discharging said flow of gas, essentially entirely free of aluminum fog, from said chamber; and delivering molten aluminum from said second molten body, together with dross accumulating thereon, to said first molten body while removing dross from said first molten body and while supplying molten aluminum from said first molten body to said second molten body to provide continuous circulation of molten aluminum between said first and second bodies.

References Cited

UNITED STATES PATENTS 3,311,363   3/1967   Phillips et al. _____ 75—68 X

FOREIGN PATENTS 1,191,110   4/1965   Germany.
108,578   12/1948   Pakistan.

DAVID L. RECK, *Primary Examiner.*

HYLAND BIZOT, *Examiner.*

N. P. BULLOCH, H. W. TARRING,
*Assistant Examiners.*